US006420857B2

(12) United States Patent
Fukui

(10) Patent No.: US 6,420,857 B2
(45) Date of Patent: Jul. 16, 2002

(54) REGULATOR

(75) Inventor: Atsuo Fukui, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/778,237

(22) Filed: Feb. 7, 2001

(30) Foreign Application Priority Data

Mar. 31, 2000 (JP) ........................................ 2000-98572

(51) Int. Cl.[7] .............................. G05F 1/40; H02J 3/12

(52) U.S. Cl. ...................................... 323/280; 323/326

(58) Field of Search ................................ 323/280, 281, 323/282, 284, 285, 315, 313, 316, 272, 274

(56) References Cited

U.S. PATENT DOCUMENTS 5,648,718 A * 7/1997 Edwards ..................... 323/274

* cited by examiner

*Primary Examiner*—Rajnikant B. Patel
(74) *Attorney, Agent, or Firm*—Adams & Wilks

(57) ABSTRACT

A regulator is provided with circtuiry for restraining a variation in a frequency band and to provide a transient response characteristic which does not depend upon load current. A load current detecting transistor is connected in parallel with an output driver transistor of the regulator to detect load current. The ON resistance of a transistor of a phase compensation RC network is varied in accordance with current variations detected by the load current detecting transistor. As a result, a frequency of a zero point for phase compenstation of the RC network is varied so that the frequency band of the regulator does not vary with load current and the transient response characteristic of the regulator is improved.

16 Claims, 3 Drawing Sheets

REGULATOR

BACKGROUND OF THE INVENTION

1. Field of the Invention

The present invention relates to phase compensation for providing a transient response characteristic which does not depend on load current of a regulator.

2. Description of the Related Art

FIG. 4 shows a constitution of a conventional regulator. A reference voltage power supply 201 supplies constant voltage Vref to an inverted input terminal of a transconductance amplifier 202. An output of the transconductance amplifier 202 is connected to the gate of a PMOS output driver transistor 204 and a phase compensating RC network 203 constituted by a resistor 208 and a capacitor 209. The source of the PMOS output driver transistor 204 is connected to an input terminal IN and the drain is connected to an output terminal OUT. The output terminal OUT is connected with a load resistor 207 and a capacitor 206 and a voltage dividing circuit 205 constituted by resistors 210 and 211. The voltage dividing circuit 205 supplies voltage produced by dividing output voltage VOUT to a noninverting input terminal of the transconductance amplifier.

When a resistance value of the resistor 208 constituting the phase compensation RC network 203 is designated by notation R208 and a capacitance value of the capacitor 209 is designated by notation C209, frequency fz of a zero point for phase compensation constituted by R208 and C209, is calculated by the following equation.

$$fz = \frac{1}{2\pi \cdot R208 \cdot C209} \tag{1}$$

When a resistance value of the load resistor 207 is designated by notation R207 and a capacitance value of the load capacitor 206 is designated by notation C206, frequency fp of a pole constituted thereby is calculated by the following equation.

$$fp = \frac{1}{2\pi \cdot R207 \cdot C206} \tag{2}$$

As is apparent from Equation (2), in accordance with a variation in the load resistor 207, the frequency fp of the pole is also changed. Meanwhile, as is apparent from Equation (1), the frequency fz of the zero point for phase compensation is a fixed value.

When load current is large, the load resistor 207 becomes small and accordingly, by Equation (2), the frequency fp of the pole is moved to a high frequency side. Further, when the load current is small, the load resistor 207 becomes large and accordingly, by Equation (2), the frequency fp of the pole is moved to a low frequency side. FIG. 5 shows frequency characteristics of the regulator when the load current is large and when the load current is small.

As shown by FIG. 5, when the load current is large, unity gain frequency at which voltage gain of the regulator becomes 1, becomes high, conversely, when the load current is small, the unity gain frequency becomes low. When the unity gain frequency is changed by the load current in this way, the transient response characteristic depends on the load current, which is not preferable. Particularly, when the load current is small, the unity gain frequency is low and accordingly, the transient response characteristic is deteriorated.

SUMMARY OF THE INVENTION

In order to resolve the above-described problem, according to the invention, there is carried out an improvement in which by varying a frequency of a zero point for phase compensation in accordance with load current, a variation in a frequency band of a regulator is restrained such that transient response does not depend upon the load current.

According to the invention, by generating current in proportion to load current by a load current detecting transistor connected in parallel with an output driver transistor for supplying current to a load and changing a resistance value of a variable resistance portion by the current, a frequency of a zero point for phase compensation is varied.

An improvement is carried out by varying the frequency of the zero point for phase compensation in accordance with the load current, thereby, a variation in a frequency band of a regulator is restrained without depending upon the load current such that transient response does not depend upon the load current.

DETAILED DESCRIPTION OF THE PREFERRED EMBODIMENTS

An explanation will be given of embodiments of the invention in reference to the drawings as follows.

Figure 1:
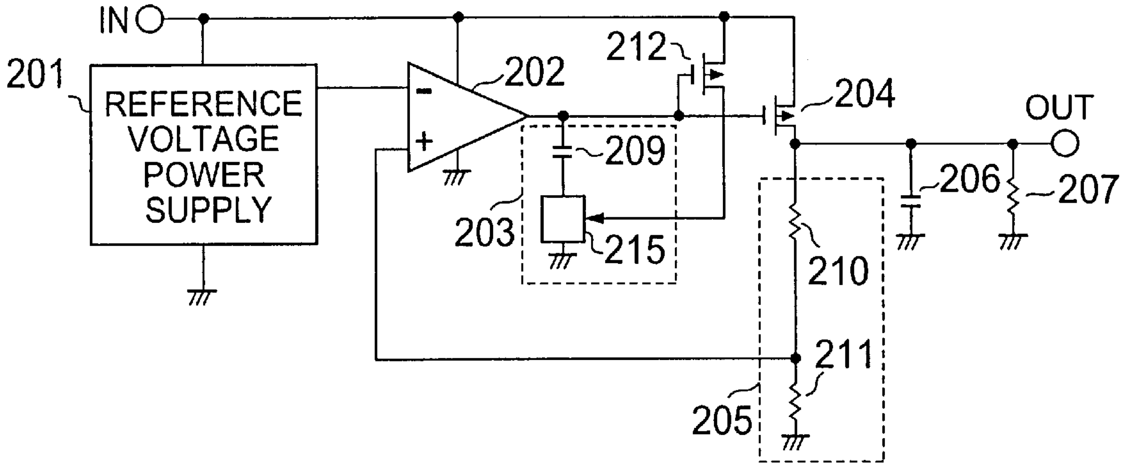
FIG. 1 is a circuit diagram of a regulator according to a first embodiment of the invention.

FIG. 1 shows a regulator according to a first embodiment of the invention. The reference voltage power supply 201 supplies the constant voltage Vref to the inverted input terminal of the transconductance amplifier 202. The output of the transconductance amplifier 202 is connected to the gate of the PMOS output driver transistor 204, the gate of a load current detecting PMOS transistor 212 and a phase compensation RC network 203 constituted by the capacitor 209 and a variable resistance portion 215. The source of the PMOS output driver transistor 204 is connected to the input terminal IN and the drain is connected to the output terminal OUT. The output terminal OUT is connected with the load resistor 207, the capacitor 206 and the voltage dividing circuit 205 constituted by the resistors 210 and 211. The voltage dividing circuit 205 supplies voltage produced by dividing the output voltage VOUT to the noninverted input terminal of the transconductance amplifier. The source of the load current detecting PMOS transistor 212 is connected to the input terminal IN and the drain is connected to the variable resistance portion 215.

When a gate width of the output driver transistor 204 is designated by notation W204, a gate length thereof is designated by L204, a gate width of the load current detecting transistor 212 is designated by W212 and a gate length thereof is designated by notation L212. Further, when drain current of the output driver transistor 204 is designated by notation I204 and drain current of the load current detecting transistor 212 is designated by notation I212, the following relationship is established.

$$I212 = \frac{W212/L212}{W204/L204} \cdot I204 \tag{3}$$

The drain current I204 of the output driver transistor 204 is current supplied to load and accordingly, the drain current I212 of the load current detecting transistor 212 becomes current in proportion to the load current and the proportional coefficient is given from Equation (3) as follows.

$$\frac{W212/L212}{W204/L204} \tag{4}$$

An arbitrary proportional coefficient can be set by pertinently adjusting gate sizes of the transistors 204 and 212.

In accordance with the Equation (3), the drain current I212 in proportion to the load current, outputted from the load current detecting transistor 212 is inputted to the variable resistance portion 215. The variable resistance portion 215 changes a resistance value thereof in accordance with inputted current.

Figure 2:
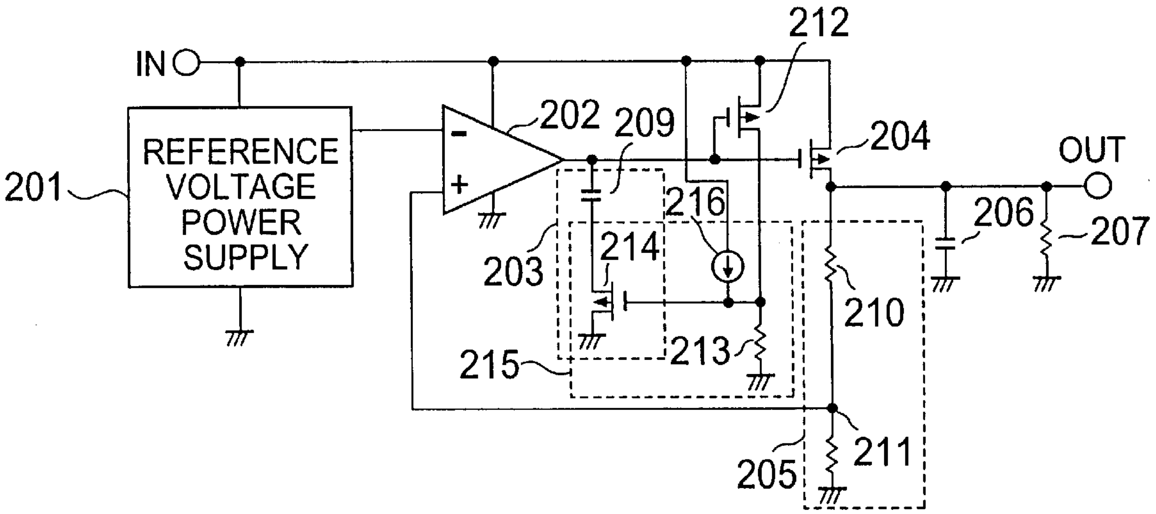
FIG. 2 is a circuit diagram of a regulator according to a second embodiment of the invention.

FIG. 2 shows an embodiment further specifying the variable resistance portion 215. The variable resistance portion 215 is constituted by a resistor 213 and an NMOS transistor 214. By flowing the drain current I212 outputted from the load current detecting transistor 212 and in proportion to the load current and current I216 outputted from a constant current source 216, in the resistor 213, voltage is generated across both ends of the resistor 213. By the voltage generated across the both ends of the resistor 213, ON resistance of the NMOS transistor 214 is changed. Further, the constant current source 216 operates such that the NMOS transistor 214 is not brought into a nonconductive state even when the drain current I212 of the load current detecting transistor 212 becomes null.

Figure 3:
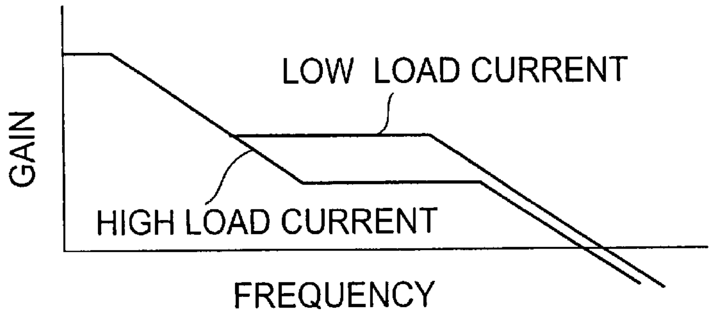
FIG. 3 is a diagram of frequency characteristics of the regulator according to the second embodiment of the invention.
Figure 4:
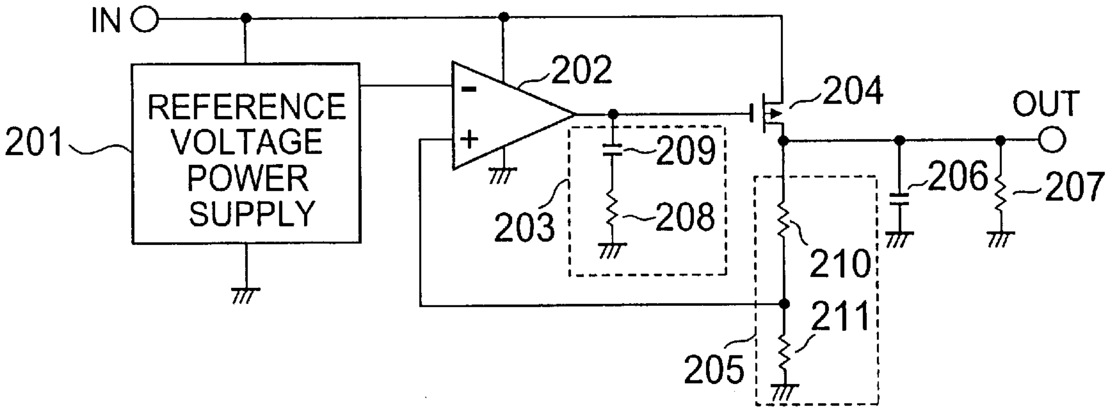
PRIOR ART FIG.4
FIG. 4 is a circuit diagram of a regulator of a related art.
Figure 5:
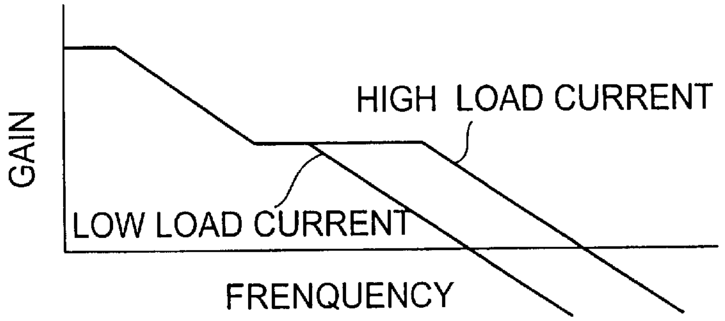
PRIOR ART FIG.5
FIG. 5 is a diagram of frequency characteristics of the regulator of the related art.

As described above, ON resistance of the NMOS transistor 214 operating as phase compensation resistor is changed in accordance with the load current and accordingly, from Equation (1), the frequency fz of the zero point for phase compensation is also changed. The frequency characteristics of the regulator become as shown by FIG. 3 and even when the load current is changed, by restraining a variation in the unity gain frequency, the frequency characteristic of the regulator is improved such that transient response does not depend upon the load current.

According to the invention, by generating current in proportion to the load current by the load current detecting transistor connected in parallel with the output driver transistor for supplying current to the load and changing the resistance value of the variable resistance portion by the current, the frequency of the zero point for phase compensation is varied.

What is claimed is:

1. A regulator circuit having a transient response characteristic which does not depend upon load current, comprising: a regulator having a phase compensation RC network; and a circuit for restraining a variation in a frequency band of the regulator in accordance with a variation in load current by changing a frequency of a zero point for phase compensation of the phase compensation RC network by changing an ON resistance value of a transistor in the phase compensation RC network in accordance with the load current of the regulator.

2. In a regulator, a circuit for restraining a load current dependency on a transient response characteristic of the regulator, comprising:

a load current detecting transistor connected in parallel with an output driver transistor of the regulator used for supplying current to a load; and a phase compensation RC network having a MOS transistor connected to an output of the load current detecting transistor, the RC network being connected to an output of a transconductance amplifier of the regulator.

3. A regulator circuit according to claim 1; wherein the regulator comprises an input terminal for receiving an input voltage, an output terminal for outputting a regulated output voltage, a transconductance amplifier, a reference voltage supply for supplying a reference voltage to the transconductance amplifier, an output driver transistor having a gate terminal connected to an output of the transconductance amplifier, a source terminal connected to the input terminal and a drain terminal connected to the output terminal, a voltage divider circuit connected to the output terminal for supplying a dividend portion of the output voltage to the transconductance amplifier, and the phase compensation RC network connected to an output of the transconductance amplifier.

4. A regulator circuit according to claim 3; wherein the circuit for restraining a variation in a frequency band of the regulator comprises a load current detecting transistor connected in parallel with the output driver transistor, a second transistor having a variable ON resistance connected to the load current detecting transistor, and a resistance connected in parallel to a gate of the second transistor, a source current of the load current detecting transistor being supplied to the resistor and the second transistor so that an ON resistance of the second transistor varies in accordance with the source current of the load current detecting transistor.

5. A regulator circuit according to claim 4; further comprising a constant current source for supplying a constant current to the resistor and the second transistor, the current view of the constant current source being set such that the second transistor is not brought into a nonconductive state even when the drain current of the load current detecting transistor becomes zero.

6. A regulator circuit according to claim 2; further comprising an input terminal for receiving an input voltage, an output terminal for outputting a regulated output voltage, a reference voltage supply for supplying a reference voltage to the transconductance amplifier, and a voltage divider circuit connected to the output terminal for supplying a dividend portion of the output voltage to the transconductance amplifier; wherein the output driver transistor has a gate terminal connected to an output of the transconductance amplifier, a source terminal connected to the input terminal, and a drain terminal connected to the output terminal, and the phase compensation RC network is connected to an output of the transconductance amplifier and the load current detecting transistor.

7. In the regulator, circuitry for restraining a load current dependency on a transient response characteristic of the regulator, the circuitry comprising:

a load current detecting transistor connected in parallel with an output driver transistor of the regulator used for supplying current to a load; and a phase compensation RC network connected to an output of a transconductance amplifier of the regulator and having a transistor with a variable ON resistance connected to an output of the load current detecting transistor.

8. A regulator according to claim 7; wherein the variable ON resistance transistor is connected to the source terminal of the load current detecting transistor.

9. A regulator according to claim 7; wherein the phase compensation RC network further comprises a resistor connected in parallel to the variable ON resistance transistor.

10. A regulator according to claim 9; wherein the phase compensation RC network further comprises a constant current source for supplying a constant current to the variable ON resistance transistor so that it is not brought into a nonconductive state even when the drain current of the load current detecting transistor is zero.

11. A regulator circuit comprising: an input terminal for receiving an input signal; an output terminal for outputting a regulated output signal; a transconductance amplifier; reference voltage supply for supplying a reference voltage to the transconductance amplifier; an output driver transistor having a first terminal connected to an output of the transconductance amplifier, a second terminal connected to the input terminal and a third terminal connected to the output terminal; a voltage divider circuit connected to the output terminal for supplying a dividend portion of the output voltage to the transconductance amplifier; a load current detecting transistor connected in parallel with the output driver transistor for generating a current proportional to load current of the regulator output by the output driver transistor; and a phase compensation RC network having a transistor with a variable ON resistance connected to an output of the transconductance amplifier and a terminal of the load current detecting transistor so that a resistance value of the variable ON resistance transistor varies in accordance with the current generated by the load current detecting transistor and a frequency of a zero point for phase compensation is corresponding varied.

12. A regulator circuit according to claim 11; wherein the phase compensation RC network further comprises a resistor connected in parallel to a gate of the variable ON resistance transistor, and a source current of the load current detecting transistor is connected to the resistor and the variable ON resistance transistor so that the ON resistance of the variable ON resistance transistor varies in accordance with the source current of the load current detecting transistor.

13. A regulator circuit according to claim 12; further comprising a constant current source for supplying a constant current to the resistor and the variable ON resistor transistor.

14. A regulator circuit according to claim 13; wherein the current value of the constant current source is set such that the variable ON resistance transistor is not brought into a nonconductive state even when the drain current of the load detecting transistor is zero.

15. A voltage regulator comprising: a transconductance amplifier having a non-inverting input terminal for receiving a reference voltage, an inverting input terminal, and an output terminal; a load current detecting transistor having a gate electrode connected to the output terminal of the transconductance amplifier; a capacitor having a first electrode coupled to the output of the amplifier; and a MOS transistor having a gate electrode connected to the load current detecting transistor, a drain electrode connected to a second electrode of the capacitor, and a source electrode connected to ground potential.

16. A voltage regulator according to claim 15; further comprising a constant current source connected to the gate electrode of the MOS transistor.

* * * * *